Inventors:
Nicholas Rohats,
BhupendraKumar V. Bhimani,
by Alfons G. Hutter
Their Attorney.

Inventors:
Nicholas Rohats,
Bhupendrakumar V. Bhimani,
by Alfred G. Hutter
Their Attorney.

United States Patent Office 3,071,724
Patented Jan. 1, 1963

3,071,724
METHOD AND APPARATUS FOR TESTING ELECTRICAL INSULATION
Nicholas Rohats, Scotia, and Bhupendrakumar Vassanji Bhimani, Schenectady, N.Y., assignors to General Electric Company, a corporation of New York
Filed Mar. 28, 1960, Ser. No. 17,890
7 Claims. (Cl. 324—54)

This invention relates to a method and apparatus for testing electrical insulation, and more particularly to a method and apparatus for performing low frequency alternating current tests on insulation in large alternating current equipment.

The insulation utilized in large alternating current equipment usually is of composite nature being fabricated of a plurality of layers of material, each layer having different capacitive and resistive characteristics. It has been recognized for many years that a high potential test at the service frequency is a reliable indicator of the suitability of an alternating current insulation system for the period of use. "Service frequency" as used herein denotes the usual operating frequency of the equipment when in normal use. However, because of the large kilovolt ampere requirements of large machines, unidirectional voltage has very often been considered a substitute for testing such insulation. The attractiveness of unidirectional voltage testing lies in the small physical size and rating of the testing equipment. While it has been always recognized that there is a great difference in unidirectional voltage stresses occurring in laminated insulation as compared to alternating current voltage stresses, unidirectional voltage testing does have value in determining certain insulation faults.

In a high potential test for alternating current apparatus operating at service frequency (for example, 60 cycles per second) it is desirable that voltage distribution inside the insulation be similar to that occurring under operating conditions and that stresses on the interlayer surfaces of the insulation be the same under test conditions as under operating conditions.

In the copending application of Bhupendrakumar V. Bhimani, Serial No. 6,755, filed February 4, 1960, entitled, "Method for Testing Electrical Insulation," assigned to the assignee of this present invention, there is described a method utilizing low frequency voltage which reproduces the above noted desirable testing characteristics. In the Bhimani application, a test alternating voltage impressed across the insulation has a frequency less than 10% of the service frequency. The potential of the test voltage is increased and the test is terminated either when a predetermined current is passed through the insulation or when the insulation has withstood a predetermined voltage level. This particular testing procedure requires charging currents which are but a small fraction of the charging currents required for conducting a similar high potential test at service frequencies.

The testing procedure outlined in the Bhimani application recognizes that the voltage distribution of an insulation system is due to its overall impedance which in turn is determined by the capacitance and resistance of the elementary components of the insulation system. In considering the magnitudes of this capacitance and resistance it is found that the impedance of the system and the resulting voltage distribution is determined substantially only by the capacitive impedance. This is based upon an analysis of many low frequency tests upon insulation specimens wherein the tests were conducted with voltages of frequencies ranging between 100 cycles per second and $\frac{1}{10}$ cycle per second, each test providing substantially accurate information of the behavior of the insulation in this range of frequencies. The data obtained indicated that voltage distribution is essentially determined by the capacitance of the component materials at frequencies in this range.

The chief object of the present invention is to provide an improved method and apparatus for conducting low frequency voltage tests on electrical insulation.

Another object of the invention is to provide a method and apparatus for conducting low frequency insulation tests utilizing alternating current of high operating frequency.

A still further object is a method and apparatus for conducting a low frequency test of electrical insulation wherein capacitive charges on the insulation are discharged during portions of the test procedure.

These and other objects of our invention will become more apparent from the following description.

Briefly stated, the invention relates to a method and apparatus for conducting low frequency voltage tests utilizing an alternating current of service frequency in which the peaks of the voltage wave supplied are varied to define an envelope wave having a frequency substantially less than the service frequency of the alternating current, a portion of the envelope wave having a first polarity being impressed across the insulation specimen, the charge on the specimen being discharged when the envelope wave substantially reaches a maximum value, a portion of the envelope wave having an opposite polarity being impressed across the specimen, the charge on the specimen being discharged substantially when the envelope wave reaches a maximum value whereby the envelope of impressed voltage across the insulation specimen is substantially sinusoidal.

The attached drawings illustrate the preferred embodiments of the invention in which.

Figure 1:
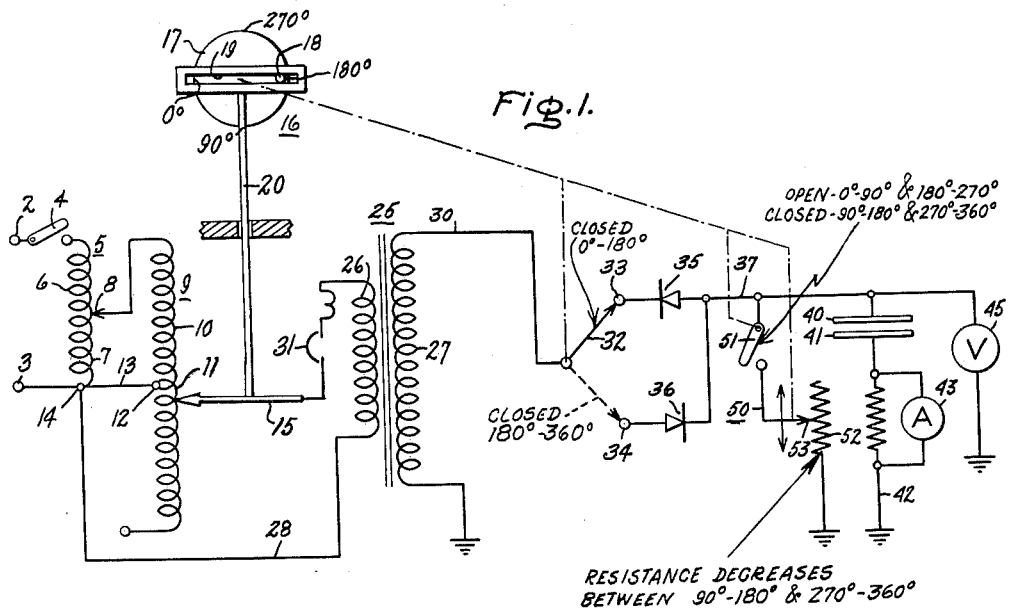
FIGURE 1 is a schematic circuit diagram of a testing apparatus for practicing the present invention.

In FIGURE 1 there is shown a schematic view of an apparatus for practicing the present invention. Alternating voltage from a suitable sourse of service frequency is impressed across the input terminals 2 and 3. This voltage is supplied to adjustable auto transformer 5 which comprises a primary winding 6 and a secondary winding 7. If desired a suitable switch 4 may be provided to disconnect transformer 5 from the voltage source. Primary winding 6 comprises the entire winding of the auto transformer while the secondary winding comprises the length of winding extending from the movable contact 8 to terminal 14.

Alternating voltage of a value determined by the position of movable contact 8 is impressed across an adjustable auto transformer 9 which comprises a primary winding 10 constituting the entire winding of the auto transformer and a secondary winding 11 which comprises the portion of the winding between center tap 12 and movable contact 15. Center tap 12 of auto transformer 9 is connected by means of conductor 13 to terminal 14 of auto transformer 5. Voltage from auto transformer 9 is supplied through movable contact 15 through circuit breaker 31 to one end of primary winding 26 of high voltage power transformer 25. The opposite end of primary winding 26 is connected by means of conductor 28 to terminal 14. The potential of the voltage impressed on primary winding 26 is increased in the secondary winding 27. This secondary winding is connected to an output conductor 30 and also to ground.

Since it is desired that the envelope wave of the service frequency voltage wave supplied to conductor 30 be cyclically varied to define an envelope having a frequency substantially less than the service frequency, suitable means are provided to cyclically move contact 15. While this may be achieved by many well known mechanical devices, in the present embodiment a scotch yoke mechanism 16 is illustrated. This scotch yoke mechanism comprises a rotor 17 whose rate of rotation may be varied in accord with the frequency desired for the envelope wave supplied to conductor 30. For example, if the frequency of the wave desired to be generated for test purposes is 1/10 of a cycle per second, rotor 17 may be rotated one complete revolution in ten seconds. The scotch yoke mechanism includes a crank pin 18 mounted on rotor 17 which coacts with a slotted slide 19 connected by a stem 20 to movable contact 15. The distance between the center of rotor 17 and crank pin 18 determines the amplitude of the motion of contact 15 and if desired this may also be adjustable.

Figure 3:
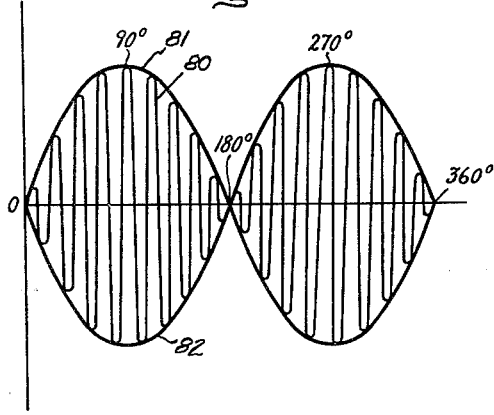
FIGURE 3 is a diagram plotting voltage versus time of the voltage generated in a portion of the apparatus shown in FIGURES 1 and 2.

The nature of the wave generated in conductor 30 illustrated in FIGURE 3 by wave 80 increases to a maximum value at 90°, reaches 0 at 180°, again reaches a maximum value at 270° and 0 at 360°. The envelope is defined by waves 81 and 82. It will be appreciated that only a portion of the envelope wave is desired to be impressed on the specimen to be tested.

In the apparatus of FIGURE 1 the voltage wave illustrated in FIGURE 3 is supplied by conductor 30 to a movable contact 32. Movable contact 32 is adapted to be switched by suitable conventional mechanical means (not shown) associated with rotor 17 so that contact 32 is connected to terminal 33 as rotor 17 moves clockwise from 0° to 180° and to terminal 34 as rotor 17 moves from 180° to 360°. Terminal 33 is connected through rectifier 35 to conductor 37; similarly terminal 34 is connected through rectifier 36 to conductor 37. Conductor 37 is connected to an electrode 40 which is associated with electrode 41 between which the electrical insulation specimen may be located. In testing large rotating equipment one of these electrodes is connected to the frame of the machine, the other is connected to the windings to permit testing of the insulation. Electrode 41 is connected to a current measuring and recording device 43 and is grounded by means of conductor 42. The voltage across the test specimen may be measured by means of voltmeter and recording device 45 connected across test specimen electrodes 40 and 41.

It has been found that in large alternating current equipment the insulation system may have a capacitance having a value of the order of one microfarad. When insulation of this type is charged there is a tendency of the insulation specimen to remain at the charged level rather than have the impressed voltage vary cyclically. It is therefore necessary to remove the capacitive charge on the insulation in a controlled manner when the test voltage wave reaches a maximum value. To perform this function a discharging circuit 50, comprising a switch 51 and a rheostat 52 having a movable contact 53 is connected across the insulation specimen.

In the operation of the apparatus in FIGURE 1, an alternating voltage of service frequency and potential supplied to terminals 2 and 3 is impressed across auto transformer 5. As a result of the particular location of contact 8, a voltage of a predetermined value is impressed across auto transformer 9. Because of the cyclical movement of movable contact 15 as a result of the movement of scotch yoke mechanism 16 the impressed voltage, increased in value in power transformer 25, is varied to define an envelope wave as shown in FIGURE 3. Circuit breaker 31 is adjusted to terminate the test in the event that large currents are passed through the insulation specimen.

Figure 4:
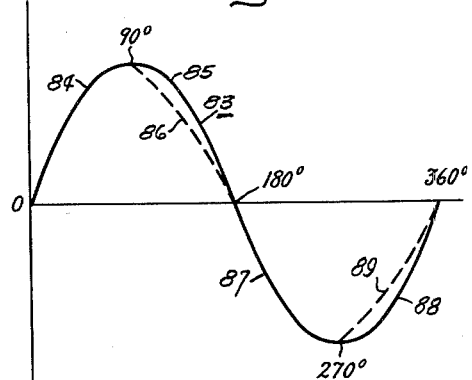
FIGURE 4 is a diagram plotting voltage versus time of the voltage impressed on the test specimen by the apparatus shown in FIGURE 1.

It is desirable that the service frequency wave be removed from the voltage wave impressed on the insulation in order that the test conducted be truly a low frequency test. It is also desirable to impress across the insulation a voltage wave having a generally sinusoidal shape. To achieve this the voltage wave of FIGURE 3 is passed through contact 32, through terminal 33, through rectifier 35 to conductor 37. Between 0° and 90° the wave form impressed on the insulation is shown as 84 in FIGURE 4. At 90° the specimen will have accumulated a charge which will tend to maintain this value of voltage unless discharged. Between 90° and 180° the wave form shown as 85 (FIGURE 4) is desired to be impressed upon the insulation specimen. To do so, means must be provided to remove the charge from the insulation; to perform this function circuit 50 is utilized. As previously mentioned this includes switch 51 and rheostat 52 having contact 53. Switch 51 and contact 53 are associated by a well known mechanical means with the scotch yoke mechanism 16 whereby at 90° switch 51 is closed and contact 53 moves in a downward direction decreasing the resistance of rheostat 52. Circuit 50 thereby provides a discharge path of varying resistance to remove the charge from the insulation whereby the voltage decreases in a manner that the insulation at 180° is substantially at zero potential. The desired discharge path is illustrated in FIGURE 4 as curve 86. This may also be achieved by switching sets of resistors such that envelope 85 is essentially applied to the insulation.

At 180° because of the mechanical means connecting contact 32 and scotch yoke mechanism 16, contact 32 moves to terminal 34 and remains at this position until the 360° position is reached. At 180°, switch 50, because of the mechanical connection, opens and contact 53 returns to the uppermost position on rheostat 52. When contact 32 is connected to terminal 33 a voltage having a first polarity is impressed on the insulation because of the orientation of the rectifier 35. When contact 32 is connected to terminal 34, because of rectifier 36, a voltage having an opposite polarity is impressed on the test specimen. Between 180° and 270° the voltage impressed on the test specimen is shown as curve 87 in FIGURE 4.

Between 270° and 360° it is desired to impress a voltage on the insulation as shown by curve 88. Because of the charge on the insulation, circuit 50 is again utilized to perform a discharging function. At the 270° position, because of the mechanical linkage between switch 51 and contact 53, circuit 50 provides a discharge path having a varying resistance thereby permitting discharge along voltage curve 89 shown in FIGURE 4. By this means the low frequency envelope wave 83 shown in FIGURE 4 having a substantially sinusoidal wave form is impressed on the insulation specimen.

In performing high potential tests the test procedure described above is repeated with contact 8 being moved in successive steps so that a constantly increasing potential is impressed across the insulation specimen.

In testing insulation, the currents therein are substantially capacitive, the resistance currents being small. The value of the resistance current is an indication of the insulation condition disclosing such factors as moisture content and the existence of dirt in the insulation. The magnitude of the resistance current may be readily ascertained from the phase angle of the current supplied to the insulation specimen. Since the tests conducted are low frequency tests, inexpensive recording equipment may be associated with current measuring means 43 and voltage measuring means 45 to read the phase angle $\phi$.

Figure 6:
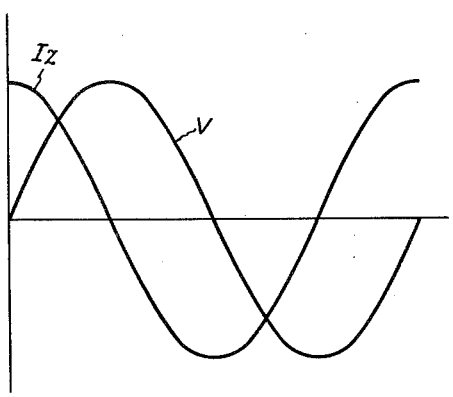
FIGURE 6 is a diagram plotting voltage and impedance current versus time for a test specimen.
Figure 7:
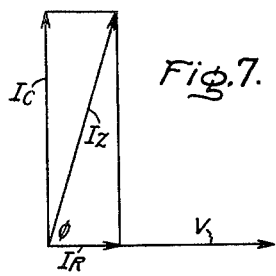
FIGURE 7 is a vector diagram of the currents in the test specimen considered in FIGURE 6 showing the relationship of the various currents constituting the impedance current.

FIGURE 6 illustrates the time relationship between the impedance current $I_z$ and the voltage V as read by recording devices 43 and 45. FIGURE 7 shows a vector diagram illustrating the relationship between the voltage V and the impedance current $I_z$. From the phase angle $\phi$ between the impedance current $I_z$ and impressed voltage V the resistance current $I_r$ and the capacitive current $I_c$ and resistance current $I_r$ can be obtained since impedance current $I_z$ is the vector sum of capacitive current $I_z$ and resistance $I_r$. Should the resistance currents $I_r$ reach a magnitude indicating high moisture or dirt in the insulation the test may be terminated by opening switch 4 in FIGURE 1.

Figure 2:
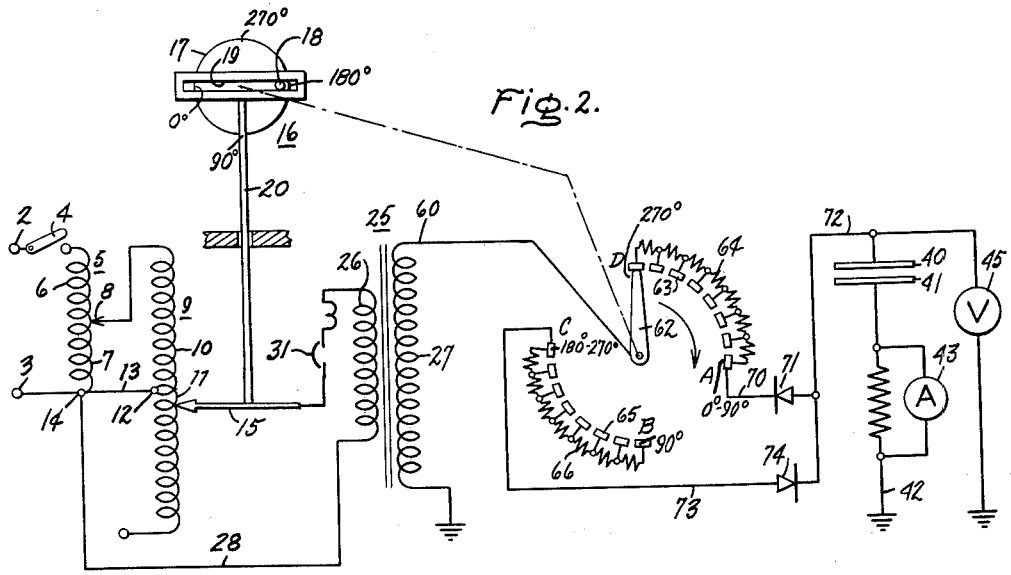
FIGURE 2 is a schematic circuit diagram of another embodiment of a testing apparatus for practicing the present invention.

Another embodiment of the invention is shown in FIGURE 2. When operating at relatively high frequencies or high capacitances the embodiment of the invention illustrated in FIGURE 1 may not remove the charge on the insulation rapidly enough whereby the potential on the insulation will not be zero at 180° intervals. The apparatus shown in FIGURE 2 includes means for removing the charge on the insulation by providing a discharge path and also means for reversing the direction of current flow from the insulation whereby the rate of decay of the charge on the specimen is accelerated to simulate a desired voltage curve impressed on the insulation.

The apparatus in FIGURE 2 utilizes auto transformers 5 and 9 and power transformer 25 in a circuit similar to that described with respect to the apparatus of FIGURE 1 to generate the voltage curve shown in FIGURE 3. Transformer 25 is connected through conductor 60 to rotatable arm 62 which is connected by suitable conventional mechanical means with scotch yoke mechanism 16 to move intermittently in a manner to be more fully described hereinafter.

Rotatable arm 62 constitutes a contact which moves intermittently and connects transformer secondary winding 27 with two groups of contacts 63 and 65, the contacts in each group being connected to each other by a plurality of resistances 64 and 66. End contact 63 at position A is connected by means of conductor 70, rectifier 71, conductor 72 to electrode 40. End contact 65 at position C is connected by means of conductor 73, rectifier 74, conductor 72 to electrode 40. Electrode 41 is connected to rotatable contact arm 62 through the ground connection through the grounded section of transformer winding 27 and conductor 60. The means for applying the voltage to the insulation (electrodes 40 and 41) have associated therewith current measuring means 43 and voltage measuring means 45.

Contact arm 62 is intermittently driven by a suitable mechanism connecting it with scotch yoke mechanism 16 in a manner whereby between 0° and 90° of rotation of rotor 17 of scotch yoke mechanism 16, contact arm 62 remains at point A. At 90° the arm moves to position B. The arm then moves uniformly along contact 65 until position C is reached at 180° of rotation of rotor 17. Arm 62 then remains at position C for the next 90° interval. At 270° rotation of rotor 17, arm 62 is turned to position D and moves uniformly to position A which constitutes 360° of rotation of rotor 17.

Figure 5:
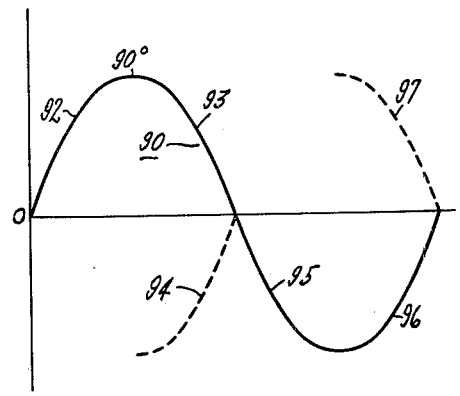
FIGURE 5 is a diagram plotting voltage versus time of the voltage impressed on the test specimen by the apparatus shown in FIGURE 2.

A detailed description of the mode of operation of the apparatus in FIGURE 2 is as follows. Initially, the rotatable arm remains at position A between 0° and 90° of rotation of rotor 17 of scotch yoke mechanism 16. During this interval voltage curve 92 between 0° and 90° (FIGURE 5) is impressed across the insulation specimen. At 90° rotatable arm 62 moves to position B and between 90° and 180° uniformly passes over contacts 65 until position C is reached. The movement of arm 62 along contacts 65 decreases the resistance in the circuit. During this interval the voltage having an envelope shown by dotted curve 94 is impressed through a circuit including electrode 40, conductor 72, rectifier 74, conductor 73, varying resistances 66, rotatable arm 62, conductor 60, secondary winding 27 of power transformer 25, to ground, to electrode 41. By this means at 90° the charge on the insulation is discharged by causing a reversal of direction of current flow from the insulation specimen to simulate the impressed voltage curve 93 in FIGURE 5. When contact arm 62 reaches position C the arm dwells at this point for 90° permitting a voltage to be impressed across the insulation having the wave form shown as 95 in FIGURE 5.

After rotor 17 has turned 270° it is again necessary to discharge the insulation. To perform this function, arm 62 passes to position D and moves uniformly toward position A varying the number of resistances 64 in the circuit. Between 270° and 360° the circuit for removing the charge from the insulation comprises electrode 41 through ground, winding 27, conductor 60, rotatable arm 62, resistance 64, conductor 70, rectifier 71, conductor 72, and electrode 40. At position D the polarity of the voltage supplied the circuit is changed to the first polarity to facilitate a rapid decay of the charge on the insulation. This decay is controlled by varying resistances 64. An envelope voltage having the first polarity (curve 97) is impressed across the circuit reversing the direction of current flow from the insulation to simulate the desired impressed voltage (curve 96) on the insulation. By this means the impressed voltage curve 90 on the insulation is sinusoidal in nature.

The present invention provides a method of testing alternating current equipment insulation with low frequency voltage although the apparatus is energized by service frequency voltage. The apparatus also includes means for removing charges from the insulation system so that the potential on the insulation is substantially sinusoidal and similar to the stresses experienced by the insulation during normal operation.

While there have been described preferred embodiments of the present invention it will be understood that the invention is not limited thereto since it may be otherwise embodied within the scope of the appended claims.

What we claim as new and desire to secure by Letters Patent of the United States is:

1. In an apparatus for conducting low frequency voltage tests of electrical insulation, the combination of means adapted to supply an alternating voltage of predetermined magnitude and frequency, means for varying the magnitude of the voltage wave supplied, the voltage wave defining an envelope having a frequency substantially less than the supply frequency, means for increasing the magnitude of the envelope voltage, means for impressing a portion of the envelope voltage wave having a first polarity on the insulation, means for removing the charge from the insulation when the envelope voltage wave substantially reaches a maximum value, means for impressing a portion of the envelope voltage wave having an opposite polarity to the insulation whereby the wave of voltage impressed across the insulation is substantially sinusoidal.

2. In an apparatus for conducting low frequency voltage tests of electrical insulation, the combination of means adapted to supply an alternating voltage of predetermined magnitude and frequency, means for varying the magnitude of the voltage wave supplied, the voltage wave defining an envelope having a frequency substantially less than the supply frequency, means for varying the magnitude of the envelope voltage, means for impressing a portion of the envelope wave having a first polarity across the insulation, means for impressing voltage having an opposite polarity across the insulation, means for switching the supply voltage from the means for impressing voltage having the first polarity to the means for impressing voltage having the opposite polarity when the envelope wave substantially reaches zero value and means for discharging the charge from the insulation when the envelope voltage wave substantially reaches a maximum value.

3. The apparatus acccording to claim 2 in which the means for discharging the charge from the insulation comprises a circuit connected across the insulation including variable resistance means whose resistance is decreased in a manner whereby the envelope wave of impressed voltage on the insulation is substantially sinusoidal.

4. In an apparatus for conducting low frequency voltage tests of electrical insulation, the combination of means adapted to supply alternating voltage of a predetermined magnitude and frequency, means for varying the magnitude of the voltage wave supplied, the voltage wave defining an envelope wave having a frequency substantially less than the supply frequency, means for increasing the magnitude of the envelope voltage, means for impressing a portion of the envelope voltage wave having a first polarity across the insulation, means for impressing a portion of the envelope wave having an opposite polarity across the insulation, means for switching the supply voltage from the means for impressing voltage having the first polarity to the means for impressing the voltage having the opposite polarity when the envelope wave substantially reaches a zero value, means for switching the supply voltage from the means for impressing voltage having the opposite polarity to the means for impressing the voltage having the first polarity when the envelope wave substantially reaches a zero value, and means for removing the charge from the insulation when the envelope voltage wave substantially reaches maximum values.

5. The apparatus according to claim 4 in which the means for removing the charge from the insulation comprises a circuit connecting across the insulation including variable means resistance whose resistance is decreased while a voltage having opposite polarity is impressed across the insulation whereby the envelope wave of the impressed voltage on the insulation is substantially sinusoidal.

6. In a method for conducting a low frequency voltage test on electrical insulation, the steps which consist of varying the magnitude of the supply voltage having a predetermined magnitude and frequency to define an envelope voltage wave having a frequency substantially less than the supply frequency, increasing the magnitude of the voltage wave which has had its magnitude varied, impressing a portion of the envelope voltage wave having a first polarity across the insulation to be tested, removing the charge from the insulation when the envelope wave voltage substantially reaches a maximum value, impressing a portion of the envelope voltage wave having an opposite polarity across the insulation and removing the charge from the insulation when the opposite polarity voltage wave substantially reaches a maximum value.

7. The method according to claim 6 further including the steps of supplying an envelope voltage wave having an opposite polarity when the envelope voltage wave having a first polarity substantially reaches a maximum value to accelerate the decay of the charge on the insulation and supplying an envelope voltage wave having a first polarity when the envelope voltage wave having the opposite polarity substantially reaches a maximum value to accelerate the decay of the charge on the insulation whereby the envelope wave of voltage impressed on the insulation is substantially sinusoidal.

References Cited in the file of this patent

UNITED STATES PATENTS 1,943,391     Paine et al. _____ Jan. 16, 1934